United States Patent [19]

Schoute et al.

[11] Patent Number: 5,390,176
[45] Date of Patent: Feb. 14, 1995

[54] LOW DELAY OR LOW LOSS SWITCH FOR ATM

[75] Inventors: Frederik C. Schoute, Hilversum; Geert A. Awater, Delft, both of Netherlands

[73] Assignee: U.S. Philips Corporation, New York, N.Y.

[21] Appl. No.: 126,146

[22] Filed: Sep. 23, 1993

Related U.S. Application Data

[63] Continuation of Ser. No. 952,878, filed as PCT/NL92/00067, Apr. 9, 1992, abandoned.

[30] Foreign Application Priority Data

Apr. 10, 1991 [EP] European Pat. Off. ............ 91200835

[51] Int. Cl.6 .......................................... H04L 12/56
[52] U.S. Cl. ................... 370/60.1; 370/85.6; 370/61
[58] Field of Search ............... 370/60, 60.1, 94.1, 370/85.1, 85.2, 85.6, 95.1, 13, 16, 17

[56] References Cited

U.S. PATENT DOCUMENTS

| 4,914,650 | 4/1990 | Sriram. | |
|---|---|---|---|
| 4,942,569 | 7/1990 | Maeno | 370/85.6 |
| 5,008,878 | 4/1991 | Ahmadi et al. | 370/94.1 |
| 5,050,161 | 9/1991 | Golestani | 370/60 |
| 5,062,106 | 10/1991 | Yamazaki et al. | 370/85.6 |
| 5,101,402 | 3/1992 | Chiu et al. | 370/17 |
| 5,140,584 | 8/1992 | Suzuki | 370/60 |
| 5,166,930 | 11/1992 | Braff et al. | 370/60 |
| 5,179,557 | 1/1993 | Kudo | 370/94.1 |

FOREIGN PATENT DOCUMENTS

0362723 9/1989 European Pat. Off.
0407161 7/1990 European Pat. Off.

OTHER PUBLICATIONS

J. Jungok et al., "Survey of Traffic Control Schemes and Protocols in ATM Networks", Proceedings of the IEEE, vol. 79, No. 2, Feb. 1991, pp. 170–189.
T. Koinuma et al., "An ATM Switching System Based on a Distributed Control Architecture", Int. Switching Symposium 90, vol. 50, May 1990, pp. 21–26.
H. Ohnishi et al., "Flow Control Schemes and Delay/Loss Tradeoff in ATM Networks", IEEE Journal on Selected Areas in Communication, vol. 6, No. 9, Dec. 1988, pp. 1609–1616.
CCITT Recommendation I.361-1991.

*Primary Examiner*—Douglas W. Olms
*Assistant Examiner*—Chau T. Nguyen
*Attorney, Agent, or Firm*—Anne E. Barschall; Jack Oisher

[57] ABSTRACT

An ATM switching arrangement in which two types of cells are distinguished. A first type of cells is marked as low loss cells and a second type of cells is marked as low delay cells. In the switching arrangement a cell buffer (9) is subdivided into a first memory area (LL) for the low loss cells and a second area (LD) for the low delay cells. In the case of the cell buffer (9) being completely filled, low loss cells get read-in priority over low delay cells. In reading out from the cell buffer low delay cells take priority over low loss cells, unless the low delay area is empty. It is also possible to set a threshold value for the content of the low loss area; when the content of the low loss area exceeds the threshold value outputting of the low loss cells can then be started.

5 Claims, 3 Drawing Sheets

LOW DELAY OR LOW LOSS SWITCH FOR ATM

This is a continuation of application Ser. No. 07/952,878, filed as PCT/NL92/00067, Apr. 9, 1992, now abandoned.

BACKGROUND OF THE INVENTION

The invention relates to a telecommunication switching arrangement for switching digital data which are contained in data cells provided with a cell header, the arrangement comprising a crosspoint switch for switching cells from an input line of the switch to an output line of the switch, the switch being provided with a cell buffer memory for storing the cells to be switched through.

Such an arrangement can be used for fast packet switching techniques which are known under the name of ATM (Asynchronous Transfer Mode). The power of ATM is its ability to provide bandwidth on demand: different sources can have different bandwidth requirements.

Fast packet switching techniques clearly provide the flexibility for integration of mixed traffic streams, such as voice, data and video. Due to provision for the stochastic bandwidth requirements of some traffic sources, it is not so clear at first sight whether a reasonable degree of utilization of switching and transmission resources can be achieved. That is, the primary benefit of fast packet switching lies in its flexibility to serve different traffic streams. The invention has for its object to provide an ATM system that can serve different types of traffic streams and which also uses capacity more efficiently than known arrangements.

SUMMARY OF THE INVENTION

Thereto, according to the invention, the switching arrangement is characterized in that:
the cell buffer memory consists of at least two memory areas, one area called the low loss area and the other area called the low delay area,
the crosspoint switch is further provided with an evaluation circuit for determining the value of a predetermined bit in the cell header, the evaluation circuit producing an evaluation output signal dependent on the determined value,
the crosspoint switch is provided with allocation means receiving the evaluation output signal, for allocating incoming cells to the low loss area or to the low delay area in dependence on the value of the evaluation output signal.

The invention makes use of the insight that some sources require low delay variation whereas other sources require low loss probabilities for ATM cells. From the CCITT Draft Recommendation I.361: "ATM layer specification for B-ISDN", January 1990, it is known that the ATM cell header should have a Cell Loss Priority (CLP) bit. This CLP bit creates the possibility to distinguish between two types of cells.

The performance of the ATM network as exposed to the user, depends primarily on the call acceptance probability. Known methods of resource allocation usually decide to accept an ATM connection if the resulting cell loss probability for of the aggregate input traffic remains below a preset maximum value. In these known methods the expected cell delay is considered of minor importance. Sometimes a higher cell loss probability can be tolerated, which then could be specified in the cell header, e.g. by using the CLP bit. Hereby two classes of traffic are introduced. The first class encompasses traffic requiring low loss probability. Traffic of the other class gives in on loss probability but gets a lower delay variation in return.

Sources that generate traffic whose time relation needs to be restored after passage through the asynchronous transfer network, benefit from a low delay variance. This is so since delay dejitter buffers in the terminal equipment can be kept smaller if the trans-network delay variance is small. Traffic sources that generate traffic for which the integrity is of prime importance, on the other hand, will prefer a low probability of cell loss. An example of the latter is (machine oriented) data traffic, an example of the first is (human oriented) audio/visual traffic.

With integrated circuit technology one can realize buffers for several hundreds of ATM cells on one chip. These buffers, together with on-chip control logic, can be used to implement LDOLL (Low Delay Or Low Loss) queues. An LDOLL queuing policy favors low delay cells in service priority and low loss cells in storage priority.

To describe the sources of different traffic streams it should be realized that a cell transmission takes a few micro-seconds, a burst of cells (activity period of a source) lasts, say, a fraction of a second, and the connection between source and destination can stand for a several minutes.

Connections do not always need the full bandwidth for the whole duration of the connection. Moreover, the bandwidth requirement usually differs for the go or return path of a connection. Some traffic sources like some video coders have a variable bit rate (VBR). E.g. in the case of a file transfer, a burst of packets is transmitted. Termination of the file transfer does not necessarily imply immediate termination of the connection because more data may be exchanged subsequently. In the case of a VBR coder, the cell rate (i.e. bandwidth) may change every 1/25 s. (resp. 1/30 s.), once every video frame. With its cell buffer array the LDOLL queue can allow for short periods of overload. This could provide an alternative for burst blocking.

BRIEF DESCRIPTION OF THE DRAWINGS

The invention will be further explained in the following with reference to the drawing figures, in which.

DETAILED DESCRIPTION OF THE PREFERRED EMBODIMENTS

Figure 1:
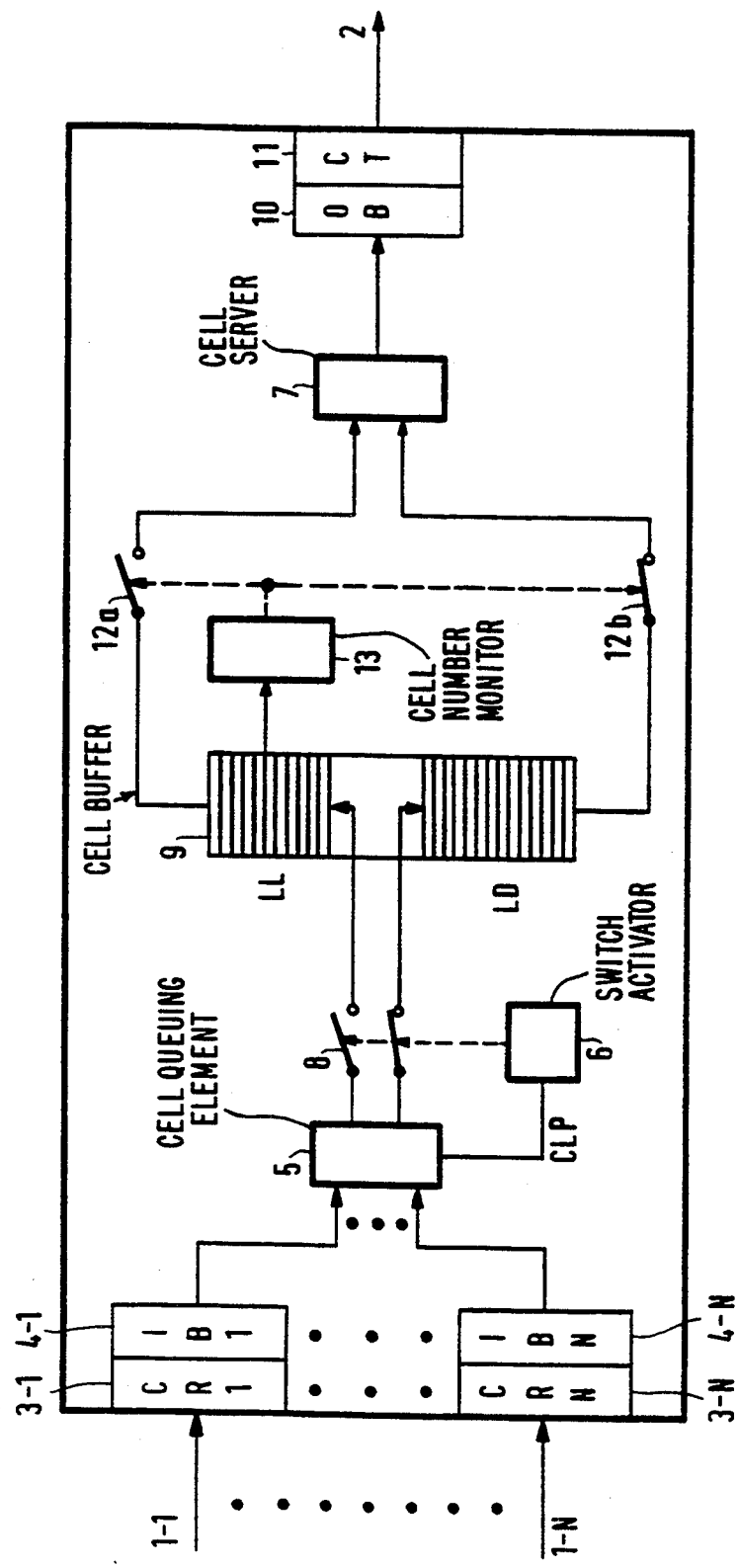
FIG. 1 shows an embodiment of an ATM switching arrangement according to the invention.

FIG. 1 shows an ATM switching arrangement which might be considered the elementary building block of an ATM network. The arrangement has N ATM input links 1—1 through 1-N and one ATM output link 2. It is assumed that all links of the switching arrangement operate synchronously; the interval between two successive (idle) cell arrivals is called a time slot.

The cell receivers 3-1 through 3-N desedalize an incoming cell and store it after complete reception into input buffers 4-1 through 4-N. Deserialization makes it possible to examine the header information, and to process ATM cells in parallel. This allows practical switching elements to cope with the high switching speeds (millions of cells per second). Cell queuing element 5 receives the ATM cells from the input buffers. This cell queuing element can be implemented as a well-known elastic read-write buffer. It transfers the non-empty cells from the input buffers to the cell buffer array 9.

Cell queuing element 5 can also evaluate the value of the CLP bit in the cell header. This value is transferred to a switch actuator 6 which controls the opening and closing of a pair of switches 8. The cell to be transferred to the cell buffer will thereby be placed in the LL part of the cell buffer or in the LD part, depending on the value of the CLP bit.

The cells are transferred from the input buffers to the cell buffer array 9 with storage priority for LL cells. That is, when the cell buffer array is full, an LL cell present at an input buffer will (under control of switch actuator 6) replace the oldest LD cell in the cell buffer array. By replacing the oldest LD cell the average delay for LD cells is minimised. LL cells are lost only due to blocking when the cell buffer array is completely filled with LL cells. LD cells are lost due to replacement or blocking when the cell buffer array is full.

The cells in the buffer array are organized in two linked lists: one list to comprise all low delay (LD) cells (the low delay area LD), the other for all low loss (LL) cells (the low loss area LL). For each type the oldest cell is always at the head of the list.

Cell server 7 takes cells out of the cell buffer 9; the type of cells to be read out depends on the number of LL cells and LD cells in the cell buffer. In this service policy a threshold TH (which f.i. has a value 40) is used, which means that LD cells are served first as long as less than 40 LL cells are in the cell buffer array 9. The decision which type of cell should be read out is taken by a monitoring circuit 13, which monitors the number of cells in the low loss area of the cell buffer. If number of cells in LL exceeds the (adjustable) threshold TH, a switch pair 12a, 12b is actuated whereby reading of cells from the LD area is stopped and reading of cells from the LL area is started.

The output buffer transfer cells to the cell transmitter 11 which serializes it and puts them onto its outgoing link 2. Every time slot, cell service takes place prior to the enqueuing of a new cell into the cell buffer.

The cell server could optionally bypass the cell enqueuer and the cell buffer. This situation occurs for example, if the cell server finds the cell array 9 empty, and the input buffers hold at least one cell. It must be noted that, even if cells were transferred from the input to the output buffers infinitely fast, the (de)serialization of cells, introduces a delay of one time slot, i.e. the time needed for transmission of an entire cell. However, if it is assumed that enqueuing and subsequent serving takes a single time slot or more, the minimal delay introduced by the switching arrangement is two time slots.

In FIGS. 2 through 5 results are shown of calculations and simulations that have been carried out to investigate the properties of the switching element of FIG. 1. In this simulation attention has been paid to variations in source activity and especially interesting is the case where temporary overload occurs. A switching element having two inputs has been assumed. It is also assumed that the LDOLL queue feeds a transmission outlet with a capacity of 150 Mbit/s. The cell size was assumed to be 53 octets, with a payload of 44 octets. A number of connections is multiplexed on each input channel. One channel carries the combined output streams of a number of VBR coders, with an average bit rate of 3.9 Mbit/s. The other channel carries traffic produced by a number of on/off sources (e.g. file servers), with a peak band width of 3 Mbit/s and an average on-time and off-time of 0.1 s. The VBR output stream consists of 90% LD cells and 10% LL cells. For the on-off traffic the reverse ratio is assumed. Each 1/30-th second, the bits of one frame are packed into cells which are transmitted at a constant average rate.

The simulation of the LDOLL queue is carried out with a cell buffer size of 50 buffers and a threshold value TH of 40 and with a varying number of traffic sources. The numbers of on-off and VBR sources were chosen the same, so that the LD load was about ⅔ of the total load. By varying the numbers of both sources from 19 to 23 the total load applied to the LDOLL queue could be varied.

Figure 2:
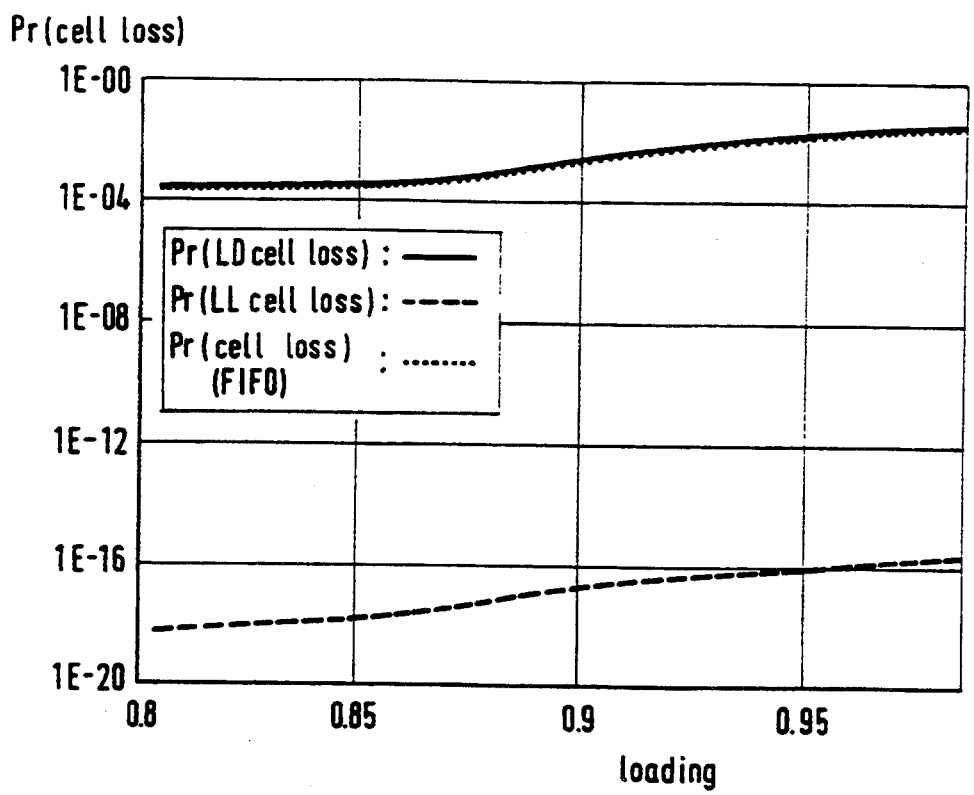
FIG. 2 shows a graphical representation of the probability of loss of LD and LL cells of the switching element according to the invention, compared with a FIFO policy.

FIG. 2 shows the probability of loss of LD (dashed line) and LL cells (unbroken line) of the switching element according to the invention, compared with a FIFO (first-in, first-out) way of outputting cells from the cell buffer (dotted line). The cell loss probability is shown in this figure as a function of the loading. The cell loss that would occur if conventional FIFO queuing were used, is almost entirely inflicted on the LD cells; the average LL cell loss probability is greatly reduced. This remains true even if the loading approaches unity. Then the LD cell loss probability becomes 1, since because of the storage priority the buffer as sen by LL cells is virtually empty. FIG. 2 shows that in case of buffer overload the LD cells, by the replacement mechanism, are the first ones to be discarded.

Figure 3:
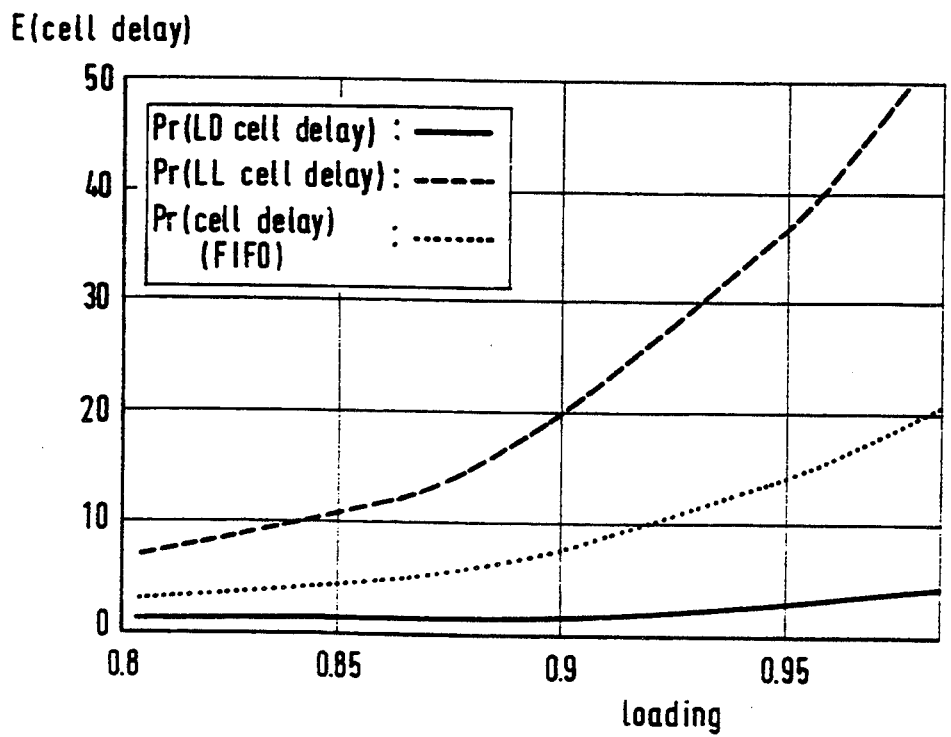
FIG. 3 shows a graphical representation of the delay of LL and LD cells compared with cell delay in a FIFO read-out policy.

In FIG. 3 the delay of LL cells (dashed line) and of LD cells (unbroken line) and are compared with cell delay in a FIFO read-out policy (dotted line). The cell delay is shown in this figure as a function of the loading. This figure shows that, compared with a FIFO policy, the delay of LD cells is significantly reduced at the expense of a higher delay of LL cells.

Figure 4:
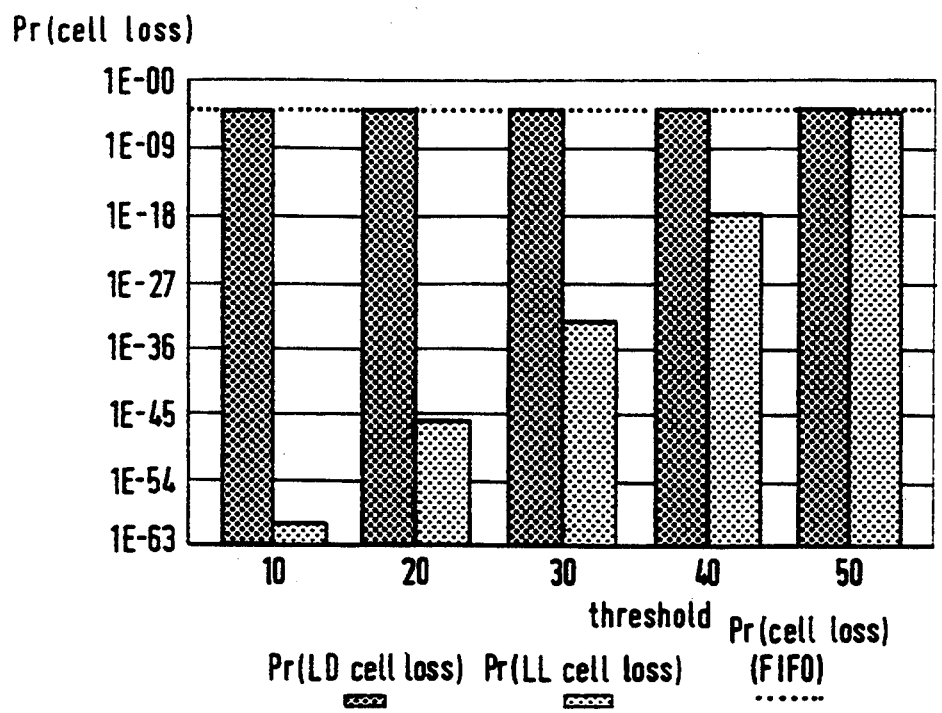
FIG. 4 shows a graphical representation of the probability of LL and LD cell loss compared with a FIFO policy, dependent on a threshold value.

FIG. 4 shows the probability of LL and LD cell loss compared with a FIFO policy, dependent on the threshold value TH. It appears that the LD loss probability is relatively insensitive to changes in the value TH.

Figure 5:
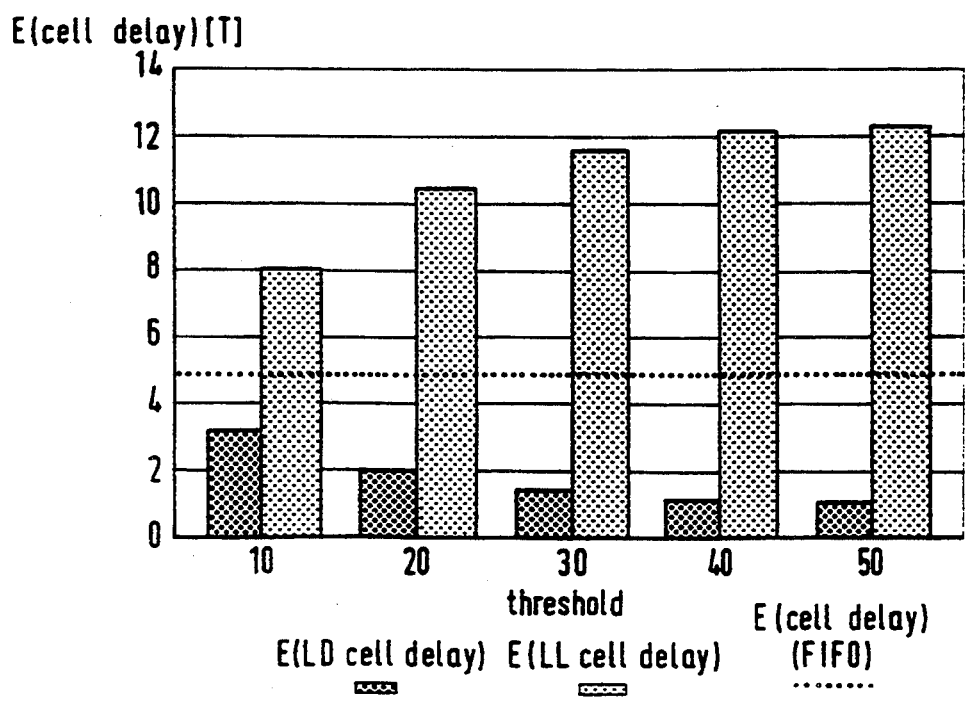
FIG. 5 shows a graphical representation of the cell delay of LL and Ld cells compared with a FIFO policy, dependent on a threshold value.

FIG. 5 illustrates the cell delay of LL and Ld cells compared with a FIFO policy, dependent on the threshold value TH. Increasing TH lessens the average delay for LD cells and increases the average LL cell delay, at the same time increasing the loss rate of LL cells. With this scenario there is no TH that yields an LD cell delay larger than that for LL cells.

We claim:

1. An a telecommunication switching arrangement for switching digital data contained in data cells provided with a cell header, said cell header containing a predetermined location for storing a bit whose value is representative of a cell loss priority of the data cell, the arrangement comprising a crosspoint switch for switching cells from a plurality of input lines of the switch to an output line of the switch, the crosspoint switch further comprising a cell buffer memory for storing the cells to be switched through, the improved arrangement comprising:

(a) the cell buffer memory comprising first and second memory areas, the first memory area for storing first data cells whose predetermined location has a first value representative of a low delay characteristic and the second memory area for storing second data cells whose predetermined location has a second value representative of a low loss characteristic, (b) means coupled to the input lines for determining the value in said predetermined location of the cell header of each incoming data cell to determine its cell loss priority, (c) means in said crosspoint switch in response to the determining means determining the first value of an incoming first cell for allocating said incoming first cell to the first memory area and in response to the determining means determining the second value of an incoming second cell for allocating said incoming second cell to the second memory area, (d) means in said crosspoint switch for reading out for switching purposes to the output line first the cells from the first memory area, unless the number of data cells stored in said second memory area exceeds a predetermined threshold value in which case the data cells stored in the second memory area are read out for switching purposes to the output line.

2. The switching arrangement of claim 1, wherein the means of claim element (b) comprises a queuing element for storing the incoming data cells and an evaluation circuit connected to the queuing element and to the allocating means.

3. The switching arrangement of claim 2, wherein the means of claim element (d) comprises a monitoring means connected to the second memory area for monitoring the number of cells stored therein and in response to the number monitored exceeding the predetermined threshold switching the reading out means to the second memory area.

4. In a telecommunication switching arrangement for switching digital data contained in data cells provided with a cell header, said cell header containing a cell loss priority field for storing a value representative of a cell loss priority of the data cell, the arrangement comprising a crosspoint switch for switching incoming data cells from a plurality of input lines of the switch to an output line of the switch, the crosspoint switch further comprising a cell buffer memory for storing the data cells to be switched through, the improved arrangement comprising:

(a) the cell buffer memory comprising first and second memory areas, the first memory area for storing first cells having a high loss priority value and the second memory area for storing second cells having a low loss priority value, (b) means coupled to the input lines for determining the value in said cell loss priority field of the cell header of each incoming data cell to determine whether its cell loss priority is a high loss or low loss priority value, (c) means in said crosspoint switch in response to the determining means determining a high loss priority value of an incoming first cell for allocating said incoming first cell to the first memory area and in response to the determining means determining a low loss priority value of an incoming second cell for allocating said incoming second cell to the second memory area, (d) means in said crosspoint switch for reading out for switching purposes first the high loss priority cells from the first memory area and for switching to reading out the low loss priority cells from the second memory area when the number of cells stored in said second memory area exceeds a predetermined value.

5. The arrangement of claim 4, wherein arrangement includes storage priority for second cells said determining means of element (c), in response to the cell buffer memory being full, storing incoming second cells having a low loss priority value in the first memory area by replacing first cells having a high loss priority value stored therein.

* * * * *